United States Patent [19]
Howard et al.

[11] 4,015,961
[45] Apr. 5, 1977

[54] FILTER BAG AND COUPLING
[75] Inventors: Laurence M. Howard, Cresskill, N.J.; Robert Schaaf, Brooklyn, N.Y.
[73] Assignee: Air Filters, Inc., Brooklyn, N.Y.
[22] Filed: Jan. 8, 1976
[21] Appl. No.: 647,612
[52] U.S. Cl. .................... 55/378; 55/381; 285/260; 285/189; 285/DIG. 22
[51] Int. Cl.² .................................. B01D 46/02
[58] Field of Search .............. 55/374–381, 55/341; 285/260, 189, 192, 259, 162, DIG. 22; 210/323

[56] References Cited
UNITED STATES PATENTS

| 3,274,760 | 9/1966 | Sage | 55/259 |
|---|---|---|---|
| 3,406,502 | 10/1968 | Wilk | 55/341 NT |
| 3,451,197 | 6/1969 | Ballard | 55/381 |
| 3,747,305 | 7/1973 | O'Dell et al. | 55/381 |
| 3,937,621 | 2/1976 | Gravley | 55/381 |

FOREIGN PATENTS OR APPLICATIONS 981,806  1/1965  United Kingdom .......... 55/341 NT Primary Examiner—Bernard Nozick
Attorney, Agent, or Firm—Friedman, Goodman & Teitelbaum

[57] ABSTRACT

A filter bag which includes an annular thin-walled band having a plurality of discrete resilient tabs extending from its outer surface along two axially separated paths. A flexible collar is secured to the outer surface of the band and conforms to the shape of the tabs to provide discrete protrusions along the two paths. The band and collar assembly is secured to one end of the filter bag. The end of the filter bag can snugly fit into a socket of a cooperating member, whereby a portion of the socket is positioned in the space between the two separated paths and is retained by the protrusions disposed on either side thereof. The retained portion of the socket includes an enclosed annular ring.

9 Claims, 9 Drawing Figures

FILTER BAG AND COUPLING

BACKGROUND OF THE INVENTION

This invention relates to filter bags, and more particularly, to an improved coupling arrangement for interconnecting the filter bag to a socket of a cooperating member, as well as to another section of a filter bag.

Filter bags are utilized in numerous industrial applications such as for the separating of gases, fluids, etc. In such typical apparatus, a tubular filter bag is employed and is interconnected at its opposite ends to sockets contained in the apparatus. For example, in a gas separation apparatus there is provided a housing with various gas chambers separated by apertured plates. A plurality of filter bags are interconnected in a parallel arrangement between two of these plates extending through one of the gas treating chambers. The gas enters into the gas treating chamber containing the filter bags, is drawn through the tubular filter material of the filter bag, and passes downward through the inside of the filter bag to the next lower chamber where it is drawn off as the output gas.

In this, as well as other types of filtering apparatus, it is necessary to replace the filter bags as they become dirty and clogged. Coupling means must therefore be provided to easily remove an old bag and replace it with a clean filter bag without excessive time, energy or expense. At the same time, while connected to the apertured plate, a fast seal must be provided to prevent leakage of the gas from the coupling means.

Various coupling arrangements have been provided to satisfy the requirements of both providing a secure interconnection, as well as easy replaceability. One such coupling arrangement is described in U.S. Patent No. 3,747,305 issued to O'Dell et al. on July 24, 1973. This patent describes the use of a flat resilient band having a soft resilient collar surroundingly engaging the outer face of the band. The collar has its ends folded upon itself to provide a cross sectional channel-like configuration with ridges at its outer edges and a groove therebetween. The band and collar assembly is interconnected at both ends of the filter bag. The diameters of the band and collar assembly are arranged with relation to the opening in the apertured plate so that the opening will snugly fit in the groove in the center of the channel-like configuration. The folded over sections of the collar provide holding ridges for securing the filter bag against the opening. However, since the opening will snugly fit in the groove of the collar, the outer and thicker ridges must be able to be easily compressed as the filter bag is inserted into or removed from the opening.

The aforedescribed coupling arrangement results in a most difficult manufacturing operation. The edges of the collar must be folded over onto itself and then secured, such as by sewing onto the main body of the collar. A single such fold may not be sufficient to provide enough retaining hold on the opening wall and it may be necessary to have at least two or more folded over sections of material. This results in a conflicting situation; the increased thickness at the edges of the collar material provides increased holding of the filter bag in the opening, but will also make insertion and removal of the bag into the opening more difficult and the cost of manufacture greater. As a result, the aforedescribed coupling arrangement becomes an expensive arrangement, difficult to manufacture and also provides difficulty in practical usage.

An additional problem with the aforementioned filter bag is that the identical coupling arrangement is provided at both ends of the bag so that either end can be inserted into an aperture plate. However, it has been found that a filter bag is not worn out uniformly. For example, the bottom portion of the bag may be worn out or become dirty faster than the upper portion. Thus, while the upper portion can still be used, the bottom portion must be replaced. However, in the aforementioned patent, when even a part of the filter bag becomes dirty or worn, the entire filter bag in the chamber must be replaced.

SUMMARY OF THE INVENTION

It is accordingly an object of the present invention to provide an improved filter bag which avoids the aforementioned problems of prior art devices.

Still a further object of the present invention is to provide a filter bag with an improved coupling arrangement for interconnection to a socket of a cooperating member.

Still another object of the present invention is to provide a coupling arrangement for a filter bag including an annular band and a flexible collar secured thereto, wherein a plurality of discrete resilient tabs are positioned on the outside surfaces of the band to effectively provide two rows of resilient protrusions with a groove therebetween.

Yet another object of the present invention is to provide a filter bag having a male coupling arrangement at one end and a female socket arrangement at the other end, whereby sections of filter bags can be interconnected one to another.

Yet a further object of the present invention is to provide a filter bag having an improved coupling arrangement which provides easy removal and replaceability of the filter bag, and at the same time holds the bag in a fixed position during filter operations.

Still another object of the present invention is to provide a filter bag with a coupling arrangement which is easy to manufacture, simple to manipulate, and effective in its operation.

Briefly, the invention comprises a filter bag for interconnection to a socket of a cooperating member. The filter bag includes a tubular filter member. The coupling arrangement includes an annular thin walled band having axially spaced apart edges. A plurality of discrete resilient tabs extend from the outer surface of the band. The tabs are peripherally spaced apart from each other along two axially separated paths. A flexible collar is secured to the outer surface of the band and substantially conforms to the shape of the tabs to thereby form discrete protrusions along the two paths. The band and collar assembly is retained at one end of the tubular filter member. The one end of the tubular filter member is then capable of snugly fitting into the socket of a cooperating member, whereby a portion of the socket member is positioned in the space between the two separated paths and retained by the protrusions disposed on either side thereof.

In one embodiment, the other end of the filter bag contains an annular ring which forms a socket to permit the coupling of one filter bag to an adjacent filter bag.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawing, like reference characters designate like parts.

DESCRIPTION OF THE PREFERRED EMBODIMENTS

Figure 1:
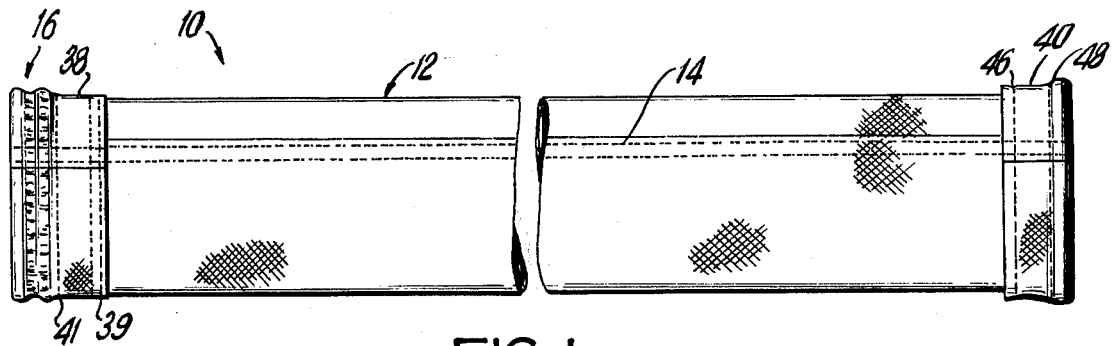
FIG. 1 is a side view of the filter bag, in accordance with the present invention.
Figure 2:
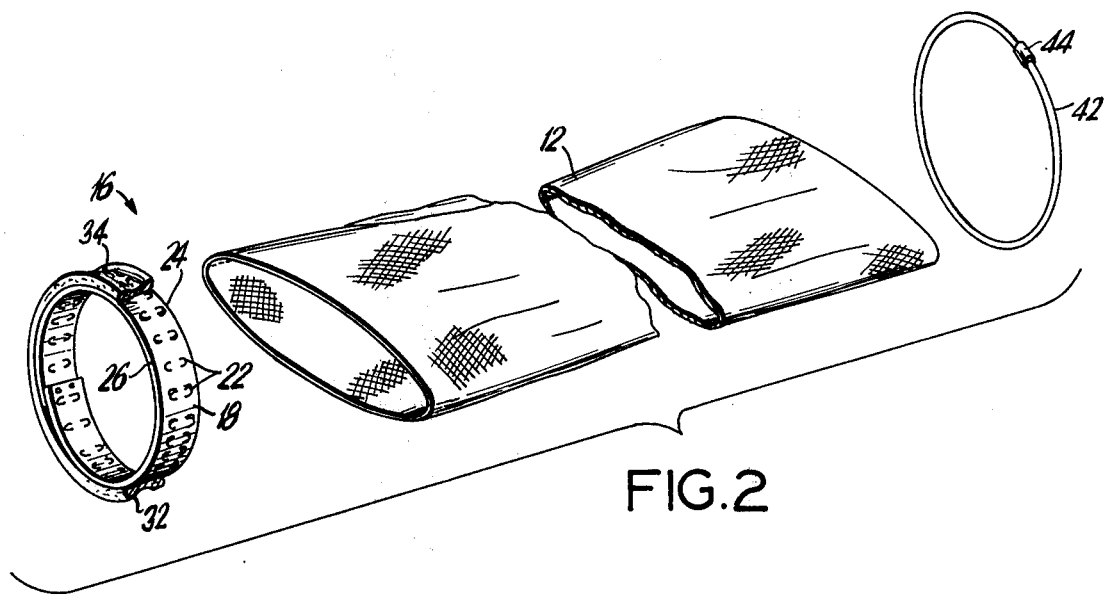
FIG. 2 is an exploded view of the filter bag showing the various coupling sections contained at the ends of the filter bag.

Referring now to FIGS. 1–5, there is shown the filter bag 10 of the present invention including a tubular filter member 12, which can be made of any one of several suitable filter materials, either of a pervious or impervious type. By way of example, it can be made out of a temperature resisting glass fiber material. The tubular member can be made of a rectangular sheet of material which is formed into a cylinder, having its edges secured or coupled together, such as by means of sewn stitching 14 along an overlapping seam.

At one end of the tubular filter member 12 is contained a coupling arrangement, shown generally at 16 and including an annular thin walled band 18. Typically, such band can be made of flexible metallic spring steel which is formed by folding a strip of the metal into a circular arrangement and fastening the overlapping edges together by fastening means, such as rivets 20. The band includes a plurality of discrete stamped-out resilient tabs 22, which extend outwardly from an outside surface of the band. The tabs are peripherally spaced from each other and are positioned along two axially separated paths, the first path being adjacent the edge 24 and the second path being adjacent the edge 26.

The tabs include a free end portion 28 which is struck outwardly from the band and an opposite attached portion having a hinge line 30 which connects the tab to the band. In the embodiment shown in FIG. 3, the hinge lines 30 of the tabs lying in the first path adjacent edge 24 all have their hinge lines lying in a substantially identical plane passing through the band on one side of the center portion of the band. Similarly, the hinge lines 30 of all of the tabs lying in the second path adjacent the edge 26 also have their hinge lines in a substantially identical plane which also passes through the band on an opposite side of the center portion of the band. As a result, the hinge lines of the tabs of the two paths are confrontingly opposed to each other on opposite sides of the center portion of the band. The free ends of the tabs of the two paths face away from each other towards their respective outer edges of the band.

Figure 4:
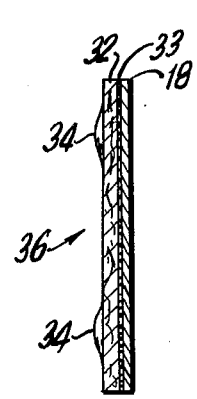
FIG. 4 is a sectional view taken along line 4—4 of FIG. 3, and specifically between adjacent protrusions.
Figure 5:
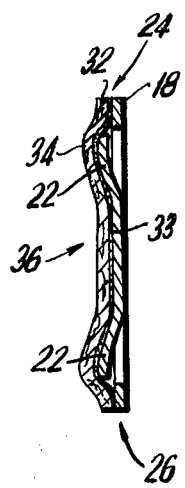
FIG. 5 is a sectional view taken along line 5—5 of FIG. 3, and specifically along a protrusion.

A flexible collar 32 is assembled to the outer surface of the band 18 by securing it to the band surface, such as by an adhesive material 33. The flexible collar 32 is assembled directly across the outer surface of the band 18 such that it substantially conforms to the shape of of the tabs 22 thereby forming discrete protrusions along the two paths and specifically lying above each of the resilient tabs. As shown in FIGS. 4 and 5 in transverse sections of the band and collar assembly, where no tabs are present as in FIG. 4 the collar will lie substantially flat onto the surface of the band, while in FIG. 5 showing a transverse section through a pair of tabs there will exist protrusions along both the upper path adjacent the edge 24 as well as the lower path adjacent the edge 26.

The protrusions, although being in discrete positions, effectively produce outer ridges adjacent both edges of the band with a center groove or recess 36 along the center portion between the two outer ridges. There results a channel-like arrangement having higher outer edges and a lower center portion.

The flexible collar 32 is made of a flat material such as a cloth-like fabric, as for example felt. It could also be made of a rubber-type material such as silicone. The collar has a rectangular cross sectional configuration and therefore need not be made with any special dies and need not include any folded over sections of material.

The band and collar assembly is secured in one end 38 of the tubular filter member and secured thereto. By way of example, the end 38 of the filter member can be folded back over the assembly, and the folded back end can be attached to the sidewall of the filter member, such as by means of the stitching 39 to define an internal annular space which contains the band and collar arrangement therein. By placing additional fastening means, such as additional stitches 41 directly adjacent the band and collar assembly, a tight fit can be made of the filter member over the band and collar assembly such that the shape of the protrusions with the groove or recess therebetween can be obtained through the tubular filter member.

At the other end 40 of the tubular filter member is placed a ring 42, typically of metallic spring steel material. The ring 42 is of substantially circular cross section and is formed of a length of tube looped into a circular configuration and held by clasping means 44. The ring 42 is also secured in the end of the tubular filter member, such as by folding over the end 40 of the filter member, and fastening the end to the sidewall of the filter member to define an internal annular space in which the ring 42 is contained. The fastening can be by means of the stitching 46 with an additional row of stitching 48 adjacent to the ring to maintain the ring in a firm position.

Figure 6:
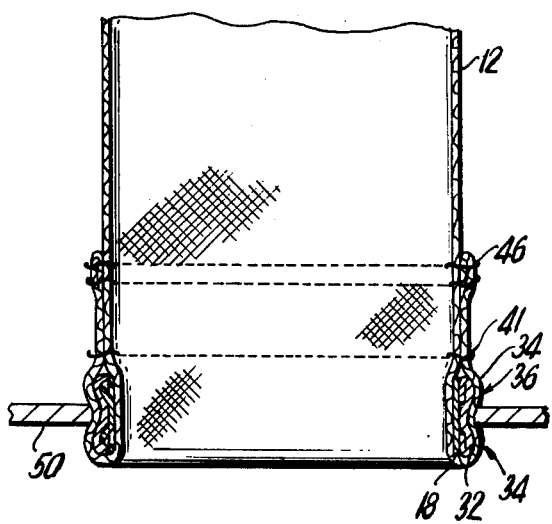
FIG. 6 shows a sectional view of one end of the filter bag coupled to an apertured plate.

With reference now to FIG. 6, it is noted that typically, the heretofore described filter bag 12 is placed in a filter apparatus and is coupled to a socket, such as an apertured plate 50 which separates various chambers of the filter apparatus. The filter bag is easily positioned in the socket by pushing the end 16 of the filter bag through the aperture so that the wall of the aperture is positioned in the groove 36 between the ridges 34. The opening of the aperture is approximately the same as the outer diameter of the recessed section 36 to provide a snug fit when the filter bag is assembled in the aperture. Because of the resiliency of the band 18, and additionally the resiliency of the protrusions, as the end of the filter bag is passed into the aperture in the plate 50, the band 18 is bent inwardly to permit easy insertion into the aperture. The spaced apart ridges 34 hold the filter bag in place in a secure arrangement with the apertured plate 50, where the outer diameter of the ridges 34 is greater than the plate opening, as shown in FIG. 6. Similarly, when removing the filter bag for replacement thereof, the resilient band 18 will again bend inwardly to permit easy removal of the filter bag from the apertured plate.

Figure 7:
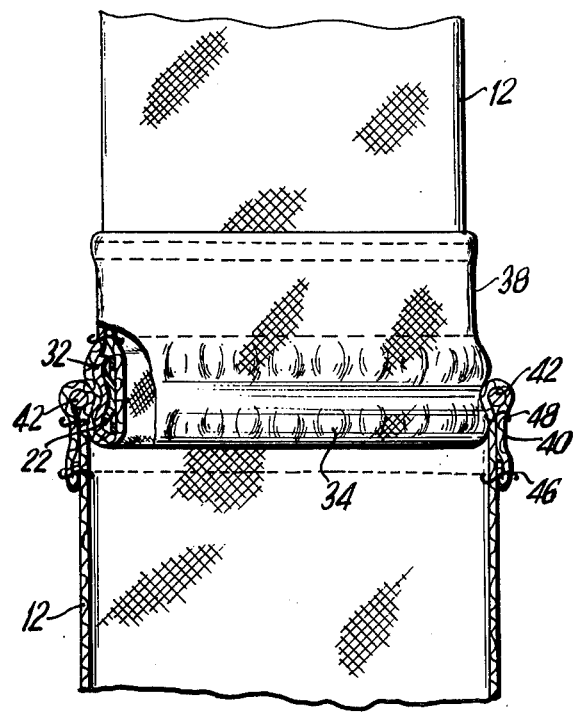
FIG. 7 shows a partially sectioned view of two opposing ends of adjacent filter bags being interconnected.

A single filter bag is usually extended between two opposing apertured plates, one end of the filter bag having a band assembly to be inserted into one apertured plate, and the other end of the filter bag is fitted over a collar extending from the other apertured plate and secured by suitable means thereto. However, by using the metal ring 42 at the opposite end of the filter bag, it is possible to interconnect adjacent sections of filter bags of the present invention, as shown in FIG. 7. The inner diameter of the ring 42 is approximately the same as the outer diameter of the recessed section 36 of the band and collar assembly, but less than the outer diameter of the spaced apart ridges 34.

The band and collar assembly is inserted into the end 40 of the filter bag adjacent thereto, so that the ring 42 fits into the groove 36 and is held between the adjacent ridges 34. The flexible band 18 will slightly bend during insertion and removal of the end of the filter bags into the ring of the adjacent filter bags in the same manner as mentioned above. Utilizing the arrangement of FIG. 7, it is possible to form a long filter bag as a composite of individual smaller sections of filter bags by interconnecting the smaller sections together. Should one of the smaller sections become worn or dirty, it is possible to replace only that section without necessarily replacing the entire composite filter arrangement. Accordingly, the band and collar assembly at one end of the composite filter bag is inserted into one of the apertured plates, and the ring at the opposite end of the composite filter bag is fitted over the collar extending from the other apertured plate and secured thereto by conventional means, such as a press-on force fit, a snap-on arrangement and like suitable attachment.

Figure 8:
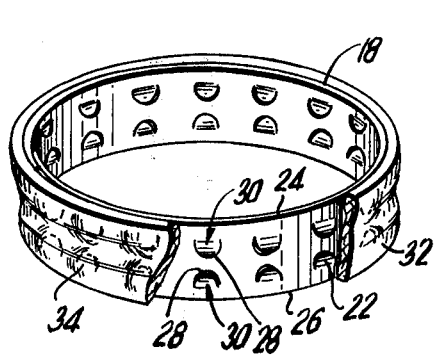
FIG. 8 shows a partially cutaway view of a second embodiment of a band and collar assembly.

Referring now to FIG. 8, there is shown an alternate embodiment of forming the tabs, wherein the hinge lines 30 of each of the tabs are disposed adjacent to the outer edges 24, 26 of the band. The free ends 28 of the tabs of the two paths face each other respectively toward the center portion of the band, being confrontingly spaced from each other.

Figure 9:
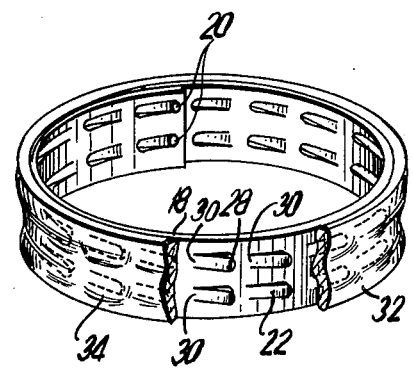
FIG. 9 shows a partially cutaway view of a third embodiment of a band and collar assembly.

FIG. 9 shows a further embodiment of forming the tab means by positioning the tabs in the same longitudinal direction around the band and having the hinge lines 30 lying in an axial direction transversely disposed on the band. The free end 28 of each tab is adjacent the hinge line 30 of the next adjacent tab in an associated path. The tabs thereby form substantially two circular rows around the band axially spaced from each other.

Figure 3:
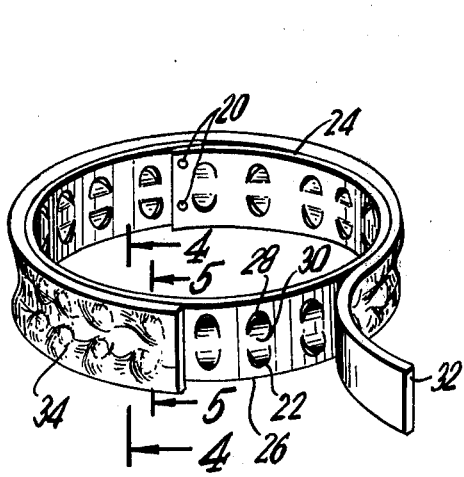
FIG. 3 is an isometric view of one embodiment of the band and collar assembly used as part of the coupling arrangement of the present invention.

Although these, as well as other arrangements can be utilized for forming the resilient tabs, it has been found that the embodiment shown in FIG. 3 is preferable. Using that embodiment, it is easy to insert and remove the filter bag from the socket since the angle of the tab is in a direction aiding the removal of the filter bag. At the same time, the plate aperture will be adequately held by means of the ridges formed by the thickness of the collar in conjunction with the filter bag material positioned over the tabs.

It will therefore be appreciated that in accordance with the heretofore described arrangement, a coupling means is provided at the end of a filter bag, which can be easily formed and can utilize a flat collar without the necessity of forming the prior art channel-like arrangement in the collar. The channel-like arrangement of the present invention is effectively produced as a result of utilizing tabs formed in the underlying band. However, the tabs struck from the band are resilient and can bend, thereby facilitating easy insertion and removal of the bag, while at the same time holding the bag fast in its position. Furthermore, by utilizing the ring at the opposite end of the filter bag as a socket, it is possible to interconnect adjacent sections of filter bags to form a composite arrangement and thereby only replace small sections without the need of replacing the entire composite filter bag.

There has been disclosed heretofore the best embodiment of the invention presently contemplated. However, it is to be understood that various changes and modifications may be made thereto without departing from the spirit of the invention.

What is claimed is:
1. A filter bag for interconnecting to a socket of a cooperating member comprising:
   a tubular filter member fabricated from a filter material;
   an annular thin walled flexible band having axially spaced apart edges;
   a plurality of discrete resilient tab means extending outwardly from an outer surface of said band, each of said tab means being defined by a free end struck outwardly from said band and a hinge line connecting each of said tab means to said band, said tab means being peripherally spaced apart from each other and being disposed along two axially separated paths around said band;
   a flexible collar secured to said outer surface of said band to define a band and collar assembly, said collar being disposed on said tab means with said collar substantially conforming to shape of said tab means to provide discrete protrusions along each of said two paths and a recess between said two paths of protrusions;
   said tubular filter member including retaining means for holding said band and collar assembly at one end of said tubular filter member;
   said one end of said tubular filter member being capable of snugly fitting into the socket of the cooperating member, whereby said resilient tab means are pressed inwardly to permit a portion of the socket member to be positioned in said recess between said separated paths, where said portion of the socket member is retained in said recess by the protrusions disposed on either side thereof.

2. A filter bag as in claim 1, and wherein the free end of all of said tabs means face toward an associated adjacent one of said edges, the hinge lines of the tab means respectively lying on each of said two paths, the hinge lines on one path being confrontingly spaced from the hinge lines on the other path.

3. A filter bag as in claim 1, and wherein the hinge lines of all of said tab means are disposed adjacent to an associated one of said edges, the free ends of the tab means respectively lying on each of said two paths, the free ends on one path being directed away from the free ends on the other path.

4. A filter bag as in claim 1, and wherein all of said tab means face in the same direction around said band, all of the hinge lines lying in an axial direction transversely disposed on said band, and the free ends of each tab means lying adjacent the hinge line of the next adjacent tab means in each of said paths.

5. A filter bag as in claim 1, and wherein said band is of a flexible metallic spring steel and said collar is a cloth-like fabric.

6. A flexible bag as in claim 1, and wherein said retaining means includes a folded back end of said filter member, and fastening means for attaching said folded back end to side walls of said filter member to define an internal annular space for containing said band and collar assembly.

7. A filter bag as in claim 1, and wherein said flexible collar has a substantially rectangular cross section.

8. A filter bag as in claim 1, and wherein the opposite end of the tubular filter member contains a coupling socket capable of snugly fitting into said recess between the two separated paths of said band and collar assembly.

9. A filter bag as in claim 8, and wherein said coupling socket includes an annular ring, and further comprising connecting means for holding said annular ring at said opposite end of said filter member, said connecting means including a folded back section of said filter member, and fastening means attaching said folded back section to side walls of said filter member to define an internal annular space for containing said annular ring.

* * * * *